US009733695B2

United States Patent
Duale et al.

(10) Patent No.: US 9,733,695 B2
(45) Date of Patent: Aug. 15, 2017

(54) BATTERY LIFE MANAGEMENT IN PORTABLE TERMINAL

(71) Applicant: International Business Machines Corporation, Armonk, NY (US)

(72) Inventors: Ali Y. Duale, Poughkeepsie, NY (US); Shailesh R. Gami, Poughkeepsie, NY (US); Louis P. Gomes, Poughkeepsie, NY (US); Rajaram B. Krishnamurthy, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/954,336

(22) Filed: Nov. 30, 2015

(65) Prior Publication Data

US 2017/0153693 A1     Jun. 1, 2017

(51) Int. Cl.
*H04B 1/38* (2015.01)
*G06F 1/32* (2006.01)

(52) U.S. Cl.
CPC .......... *G06F 1/3296* (2013.01); *G06F 1/3212* (2013.01)

(58) Field of Classification Search
CPC ............................. G06F 1/3296; G06F 1/3212
USPC .......................................................... 455/572
See application file for complete search history.

(56) References Cited

U.S. PATENT DOCUMENTS

| 8,504,123 | B1* | 8/2013 | Choi ................. H04W 52/0229 455/127.5 |
| 8,948,781 | B2 | 2/2015 | Wang et al. |
| 9,122,480 | B2* | 9/2015 | Bold ...................... G06F 1/3203 |
| 2015/0163749 | A1 | 6/2015 | Chawla |
| 2016/0132369 | A1* | 5/2016 | Lee ........................ G06F 9/4806 713/2 |
| 2016/0205139 | A1* | 7/2016 | Davies .................... H04L 63/20 726/1 |

FOREIGN PATENT DOCUMENTS

| WO | 2014/086273 A1 | 12/2014 |
| WO | WO2014008627 A1 | 12/2014 |

OTHER PUBLICATIONS

Mell, et al., "The NIST Definition of Cloud Computing", National Institute of Standards and Technology Special Publication 800-145—7 pages (Sep. 2011).

* cited by examiner

*Primary Examiner* — Amancio Gonzalez
(74) *Attorney, Agent, or Firm* — Cantor Colburn LLP; Steven Chiu

(57) ABSTRACT

Aspects include a method, system, and computer program product for managing battery life in a portable terminal. Managing battery life in the portable terminal may include enabling a sleep mode in the portable terminal in response to detection of a sleep event, and enabling an operation mode in the portable terminal in response to detection of an operation event. The portable terminal may include a first processor and a second processor. The enabling the sleep mode may include reducing power consumption of the first processor. The enabling the operation mode may include detecting the operation event with the second processor while the portable terminal is in the sleep mode. A rate of battery power consumption during the sleep mode may be lower than a rate of battery power consumption during the operation mode.

19 Claims, 8 Drawing Sheets

BATTERY LIFE MANAGEMENT IN PORTABLE TERMINAL

BACKGROUND

The present invention relates generally to portable terminals and, more specifically, to battery life management in portable terminals.

A common issue with portable terminals such as cellular phones, tablets, or other similar devices is that battery life of the portable terminal is limited. Even when the portable terminal is not being actively used, there may be applications running in the background, the portable terminal may be scanning for signals, or the portable terminal may be receiving communications, all of which consumes power.

SUMMARY

Embodiments include a method, system, and computer program product for battery life management in a portable terminal.

An embodiment of a method may include enabling a sleep mode in the portable terminal in response to detection of a sleep event; and enabling an operation mode in the portable terminal in response to detection of an operation event. The portable terminal may include a first processor and a second processor. The enabling the sleep mode may include reducing power consumption of the first processor and turning off active applications of the portable terminal. The enabling the operation mode may include detecting the operation event with the second processor while the portable terminal is in the sleep mode. A rate of battery power consumption during the sleep mode may be lower than a rate of battery power consumption during the operation mode.

An embodiment of a system may include a first processor, a second processor, and a memory having computer readable instructions. The first processor and the second processor may be structured to execute the computer readable instructions. The computer readable instructions may include the method described above.

An embodiment may also include a computer program product for managing battery life in a portable terminal. The computer program product may include a computer readable storage medium having program instructions embodied therewith. The program instructions executable by a processor may cause the processor to perform the method described above.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In view of a desire to prolong the battery life of portable terminals, it would be helpful to reduce power consumption when the portable terminals are not in use. Accordingly, some embodiments of a method, system, and computer program product for battery life management in a portable terminal are described below.

Figure 1:
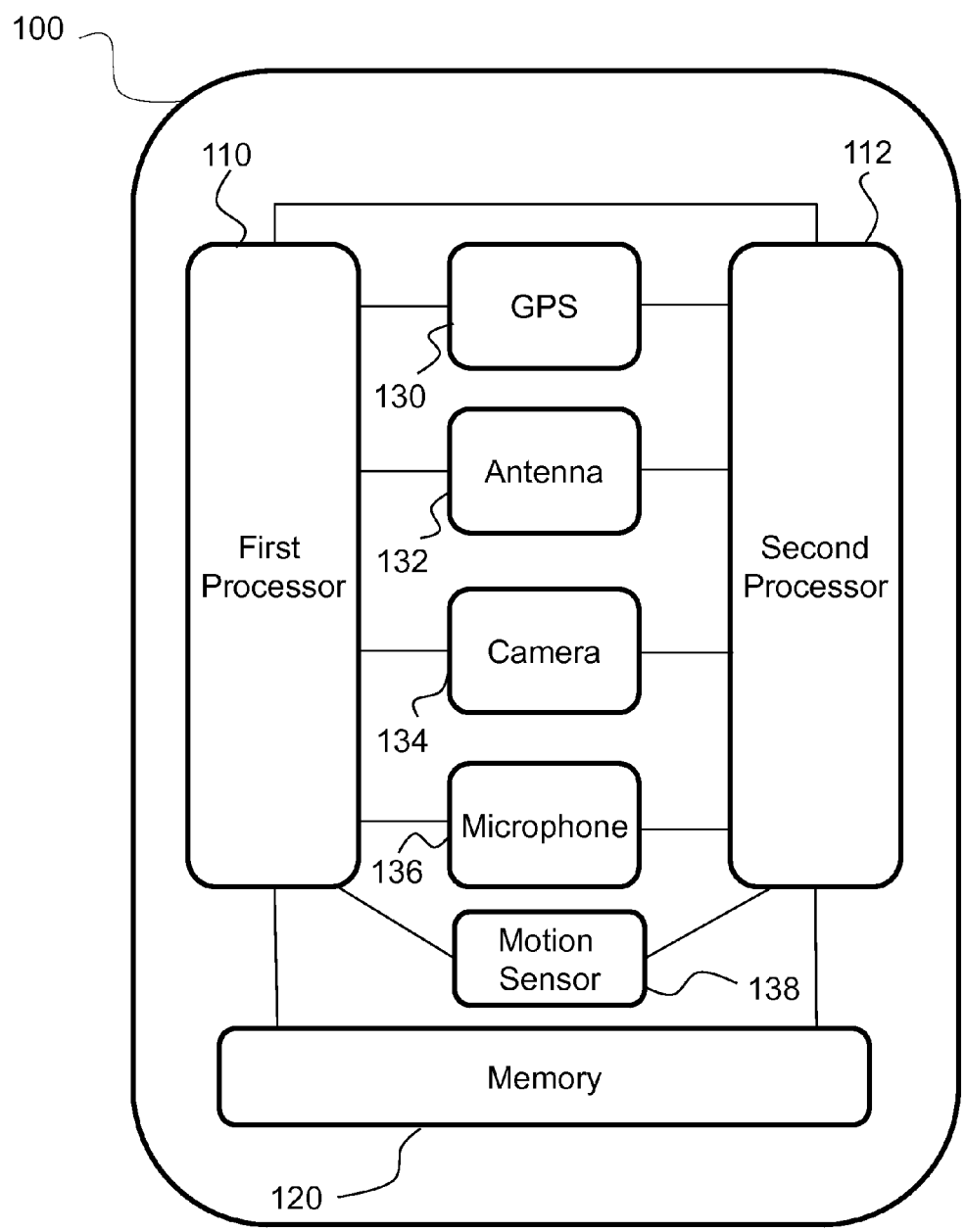
FIG. 1 depicts a block diagram of a portable terminal in accordance with some embodiments of this disclosure.

FIG. 1 shows an embodiment of a portable terminal 100. Portable terminal 100 may include a first processor 110, a second processor 112, a memory 120, a global positioning system (GPS) module 130, an antenna 132, a camera 134, a microphone 136, and a motion sensor 138. Motion sensor 138 may include structures such as an accelerometer, gyroscope, compass, or the like. It will be understood that FIG. 1 is a schematic showing the conceptual relationships between components of portable terminal 100, and is not intended to show a precise physical structure.

First processor 110 is the main processor of the portable terminal 100, and second processor 120 is a secondary processor that has a lower rate of power consumption than that of first processor 110.

In order to manage battery life of the portable terminal 100, an embodiment of the portable terminal 100 may operate in two modes: an operation mode and a sleep mode. During the operation mode, first processor 110 is operative and controls the functions of the cell phone, such as running applications, controlling GPS module 130, receiving phone calls or text messages through antenna 132, operating camera 134, or receiving sound input through microphone 136. In contrast, in the sleep mode, power consumption of the first processor 110 is reduced and second processor 120 controls the functions of the portable terminal 100. In other words, a rate of battery consumption of portable terminal 100 during sleep mode is lower than a rate of battery consumption of portable terminal 100 during operation mode.

In order to reduce power consumption and preserve battery life, the second processor 120 may be provided with a limited set of functionality compared to the first processor. For example, while in sleep mode, most or all of the applications of the portable terminal 100 may be deactivated and inaccessible by the second processor 120. The second processor may have limited access to other hardware or software components such as GPS 130, antenna 132, camera 134, and microphone 136 so as to monitor conditions and determine when to leave sleep mode and enable operation mode.

Figure 2:
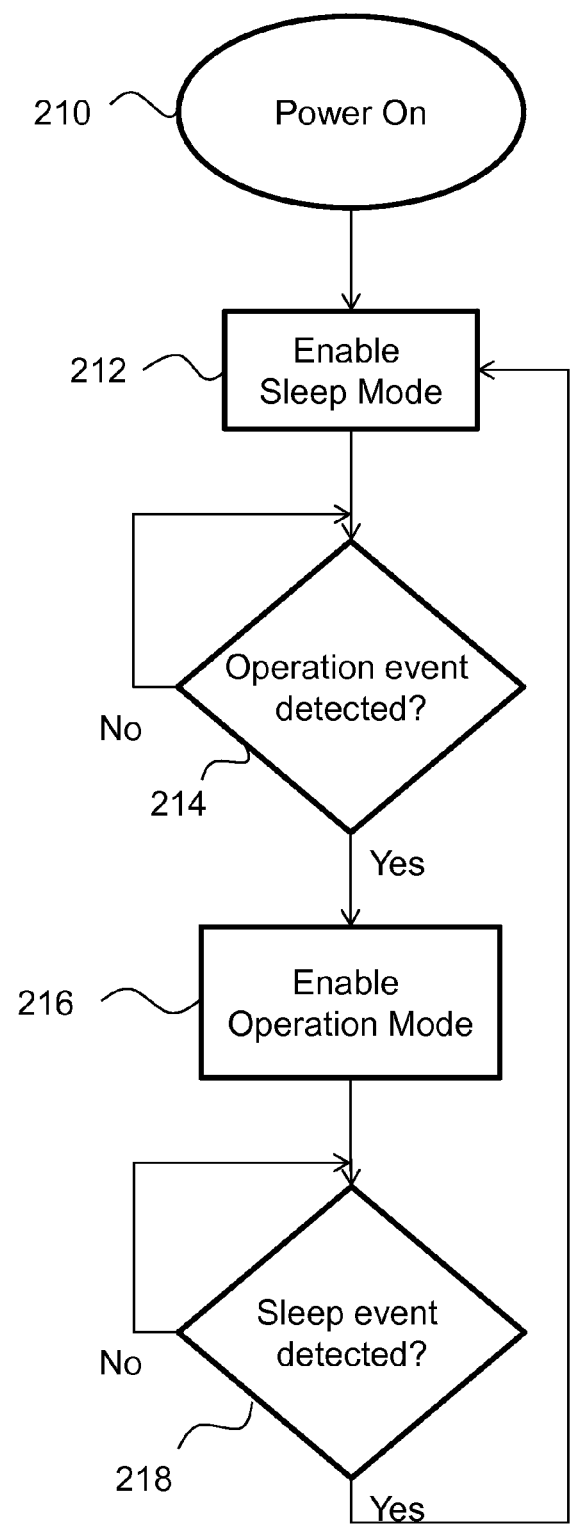
FIG. 2 depicts a flow chart of a method for managing battery life in a portable terminal in accordance with some embodiments of this disclosure.

FIG. 2 depicts a flow chart of an embodiment a method for managing battery life in the portable terminal 100. For example, in block 210, the portable terminal is turned on. Next, in response to being turned on, sleep mode is enabled in block 212. Once sleep mode is enabled, second processor 120 monitors for the detection of an operation event, and determines whether an operation event is detected in block 214. Examples of operation events will be discussed below. If no operation event is detected ("No" at 214), then the second processor 120 continues to monitor for the detection of an operation event. If an operation event is detected ("Yes" at 214), then the operation mode is enabled at block 216. In other words, the operation mode is enabled in response to the detection of an operation event.

Once the operation mode is enabled, the portable terminal 100 will monitor for the detection of a sleep event, and determines whether a sleep event is detected in block 218. Examples of sleep events will be discussed below. If no sleep event is detected ("No" at 218), then the portable terminal 100 continues in operation mode and monitors for detection of a sleep event. If a sleep event is detected ("Yes" at 218), then sleep mode is enabled in portable terminal 100 at block 212.

Figure 3:
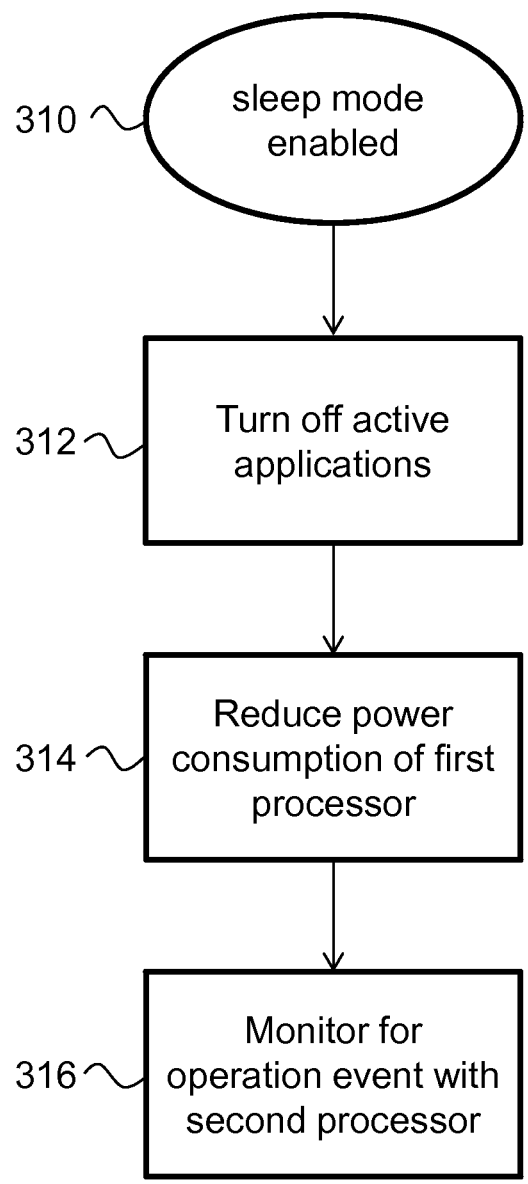
FIG. 3 depicts a flow chart of a method for enabling a sleep mode in a portable terminal in accordance with some embodiments of this disclosure.

FIG. 3 is a flow chart depicting an embodiment of enabling the sleep mode. For example, sleep mode may be enabled at block 310, whether by turning on the portable terminal or by detecting a sleep event. In response to sleep mode being enabled, active applications may be closed or turned off at block 312. Further, in response to sleep mode being enabled, power consumption of first processor 110 may be reduced at block 314. While in sleep mode, the second processor 120 may monitor for an operation event at block 316.

Figure 4:
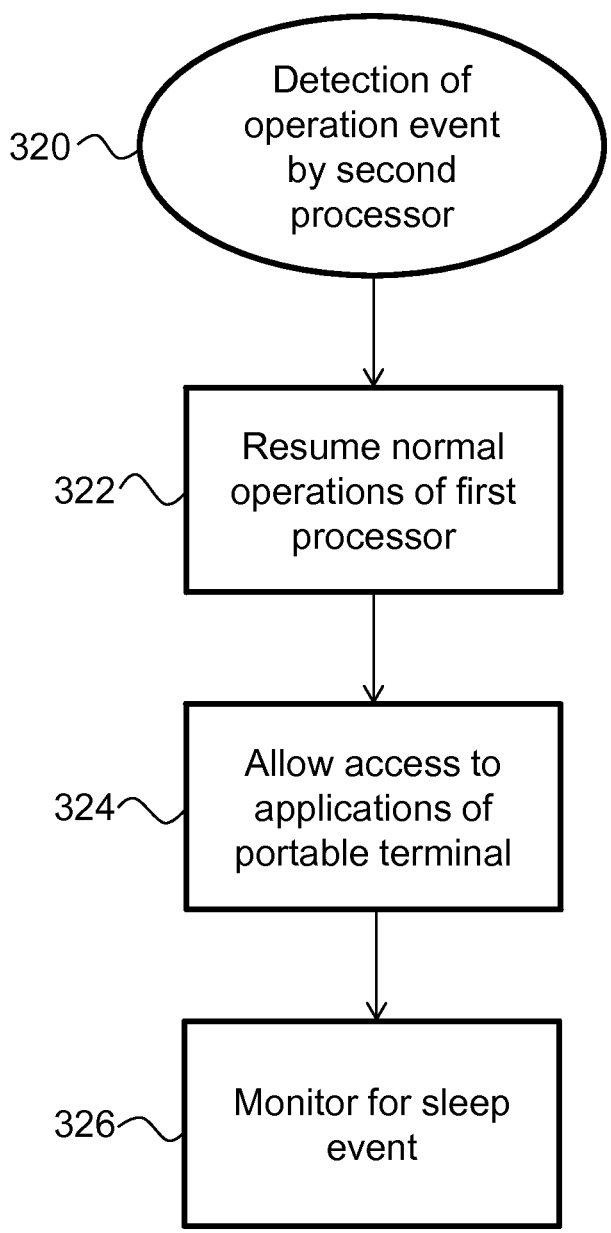
FIG. 4 depicts a flow chart of a method for enabling an operation mode in a portable terminal in accordance with some embodiments of this disclosure.

FIG. 4 is a flow chart depicting an embodiment of enabling the operation mode. For example, the second processor 120 may detect an operation event at block 320. In response to detection of the operation event by second processor 120, normal operations of first processor 110 may be resumed at block 322, and access to applications of the portable terminal may be allowed at block 324. While in operation mode, the portable terminal 100 may monitor for a sleep event at block 326.

There may be a number of different defined events that cause the portable terminal 100 to transition from sleep mode to operation mode, these events being the operation events. The operation events may be loosely grouped into continuous operation events and non-continuous operation events. Continuous operation events are events that persist over a period of time; i.e., they are non-instantaneous. In contrast, non-continuous events are instantaneous events.

One example of a continuous operation event may be detection of the portable terminal 100 within a predetermined location. For example, the portable terminal 100 may be configured so as to enable operation mode when the portable terminal 100 is detected to be at the user's house. The user can customize the configuration of the portable terminal 100 to enter a variety of different predetermined locations, such as home, work, a café, etc. The detection of the portable terminal 100 within the predetermined location can be accomplished by the second processor 120 operating in conjunction with the GPS module 130 of the portable terminal. The portable terminal 100 can also be configured so as to vary the distance from the predetermined location at which the operation event occurs. For example, the user may configure the portable terminal 100 so that the operation event occurs when the portable terminal 100 is within 20 feet of the predetermined location, within 50 feet of the predetermined location, within 100 feet of the predetermined location, or any other suitable distance. It will be understood that these distances are provided as examples only and are not intended to be limiting.

Another example of a continuous operation event may be detection of proximity of the portable terminal to a predetermined object. For example, the portable terminal 100 may be configured so as to enable operation mode when the portable terminal 100 is detected to be proximate to the user's smartwatch. The predetermined object may be any variety of objects that are detectable wirelessly, such as through WiFi, cellular networks, blue-tooth, RFID, or another other suitable signal or means of communication. Other possible predetermined objects may be key chains, automobiles, laptops, tablets, gaming console, or any other suitable object. It will be understood that these examples are not meant to be limiting, and are only given to show the broad variety of objects that may serve as the predetermined object. Additionally, similarly to the predetermined location discussed above, the portable terminal 100 may be configured so as to vary the distance from the predetermined object at which the operation event occurs. For example, the user may configure the portable terminal 100 so that the operation event occurs when the portable terminal 100 is within 5 feet of the predetermined object, within 10 feet of the predetermined object, within 25 feet of the predetermined object, or any other suitable distance. It will be understood that these distances are provided as examples only and are not intended to be limiting.

Another example of a continuous operation event may be detection of connection of the portable terminal 100 to an external power supply. The external power supply may be a wired power supply or a wireless charging device. When the portable terminal 100 is connected to the external power supply, management of battery life of portable terminal 100 is less of a concern and the portable terminal 100 can transition to operation mode.

Another example of a continuous operation event may be detection of a predetermined battery level of the portable terminal 100. For example, the user may configure the portable terminal 100 such that if the battery level is equal to or greater than 70%, then the portable terminal 100 is maintained in operation mode. The exact value of the predetermined battery level may be varied by the user.

On example of a non-continuous operation event may be detection of a predetermined sound. The detection of the predetermined sound may be accomplished by the operation of second processor 120 in conjunction with microphone 136. The predetermined sound may be a predetermined sequence of clapping sounds, a predetermined voice command, a whistle, or any other suitable sound. Portable terminal 100 may be configured such that the user can vary the parameters of the predetermined sound.

Another example of a non-continuous operation event may be detection of a predetermined motion. The detection of the predetermined motion may be accomplished by the operation of the second processor 120 in conjunction with camera 134 or motion sensor 138. The predetermined motion may include motions such as waving a hand in front of camera 134, moving portable terminal 100 in small circles, or shaking portable terminal 100. Portable terminal 100 may be configured such that the user can vary the parameters of the predetermined motion.

Another example of a non-continuous operation event may be detection of an incoming communication. The incoming communication may be a communication such as a phone call, a text message, an email, or other type of communication that can be received by portable terminal 100. The detection of the incoming communication may be accomplished by the operation of the second processor 120 in conjunction with antenna 132. Portable terminal 100 may be configured such that the user can vary the parameters of the incoming communication. For example, a user may decide that 5 incoming texts within a period of time constitute an operation event, or that 2 telephone calls within a period of time constitute an operation event. The parameters of the operation event can also be dependent on the origin of the incoming communication. In other words, the user may define groups of contacts and assign varying numbers of communications to each group. For example, portable terminal 100 may be configured such that 5 texts from a group identified as immediate family members constitutes an operation event, while 10 texts from a group identified as co-workers constitutes an operation event.

In consideration of the logical operations involved in determining whether an incoming communication constitutes an operation event, the logical operations may be performed by a cloud computing environment (described in detail below) so as to preserve battery life of the portable terminal 100. For example, the cloud computing environment may analyze incoming communications, determine who the communications are from, and calculate how many communications are received in a given period of time. If these communications satisfy predetermined conditions set by the user, then the cloud computing environment can send a signal to portable terminal 100 to enable operation mode. This can reduce the amount of processing that must be performed by the second processor 120 while in sleep mode, thereby further preserving battery life of portable terminal 100.

There may be a number of different defined events that cause the portable terminal 100 to transition from operation mode to sleep mode, these events being the sleep events.

One example of a sleep event may be the detection of an absence of one of the continuous operation events for a predetermined period of time. For example, if the portable terminal 100 detects that it is no longer within the predetermined distance of the predetermined location, this may constitute a sleep event. Alternatively, if the portable terminal 100 detects that it is no longer within the proximity of the predetermined object, this may constitute a sleep event. Alternatively, if the portable terminal 100 detects that it is no longer connected to an external power supply, this may constitute a sleep event. The portable terminal 100 may be configured such that the user can vary the predetermined amount of time necessary for the absence of a continuous operation event to be considered a sleep event.

Another example of a sleep event may be the battery level of the portable terminal being at or below a predetermined level. For example, the portable terminal 100 may be configured such that whenever it falls below 70% battery level, it is considered to be a sleep event. The portable terminal 100 may be configured such that the user can vary the predetermined battery level that triggers the sleep event.

Another example of a sleep event may be the startup of the portable terminal 100. For example, portable terminal 100 may be configured to enter sleep mode directly after starting up.

The operation events and sleep events may vary depending on the battery level of the portable terminal 100. For example, at higher battery levels, the operation events and sleep events may be configured so that the operation mode is more easily enabled and sleep mode is less likely to be enabled. Conversely, at low battery levels, the operation events and sleep events may be configured so that operation mode is less likely to be enabled and sleep mode is more likely to be enabled.

For example, regarding the operation event of detection of the portable terminal within a predetermined location, the predetermined distance from the predetermined location can vary based on battery level. For example, at high battery levels, the predetermined distance may be set to a relatively large distance, thereby making it easier to enable operation mode. In contrast, at low battery levels, the predetermined distance may be set to a relatively small distance, thereby making it less likely to enable operation mode and more likely to enable sleep mode when leaving the predetermined location. Additionally, certain predetermined locations may be deactivated as the battery level decreases, thereby limiting the options for detecting an operation event.

Similarly, regarding the operation event of proximity of the portable terminal to a predetermined object, the predetermined distance from the predetermined object can vary based on battery level. For example, at high battery levels, the predetermined distance may be set to a relatively large distance, thereby making it easier to enable operation mode. In contrast, at low battery levels, the predetermined distance may be set to a relatively small distance, thereby making it less likely to enable operation mode and more likely to enable sleep mode when leaving the proximity of the predetermined object. Additionally, certain predetermined objects may be deactivated as the battery level decreases, thereby limiting the options for detecting an operation event.

The parameters of the operation event of detection of an incoming communication may also be varied based on the battery level of the portable terminal 100. For example, at higher battery levels, it may take relatively less communications to trigger an operation event. Conversely, at low battery levels, it may take relatively more communications to trigger the operation event. This variance of the parameters can be implemented whether it is the second processor 120 that is processing the incoming communications direction, or whether the second processor 120 is merely receiving a signal from the cloud computing environment that is processing the incoming communications.

It is also possible for the portable terminal 100 to be configured to require a combination of operation events in order to enable the operation mode. The combination of operation events may be known as a super event. The requirement of a super event to enable operation mode helps to prevent inadvertent enablement of operation mode, thereby helping to preserve battery life of the portable terminal. The super event may be a combination of two continuous events, a combination of two non-continuous events, or a combination of one continuous event and one non-continuous event. Additionally, the portable terminal may be configured such that a single operation event is required to enable operation mode at higher battery levels, while a super event may be required to enable operation mode at lower battery levels.

Figure 5:
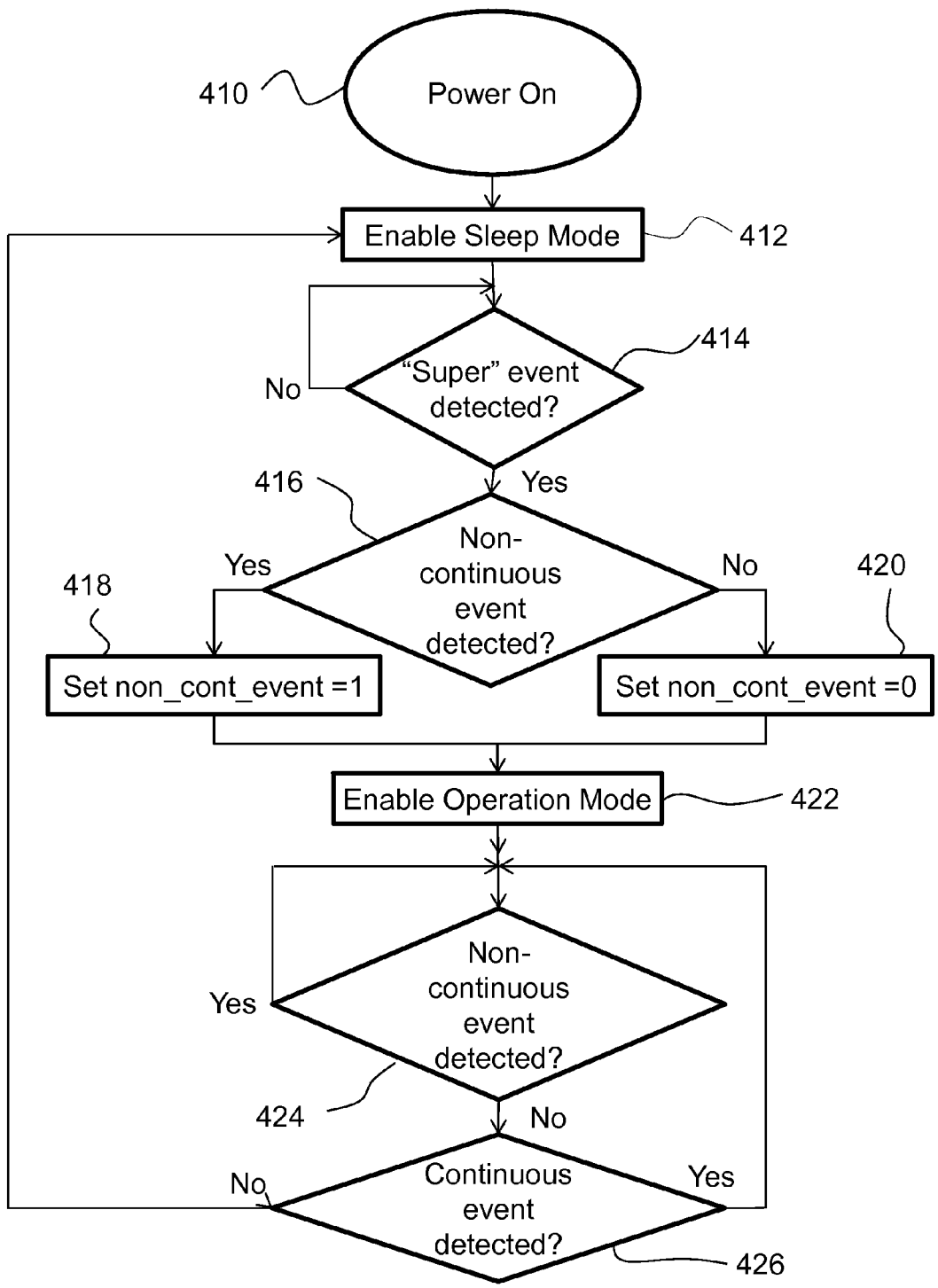
FIG. 5 depicts a flow chart of a method for managing battery life in a portable terminal in accordance with some embodiments of this disclosure.

FIG. 5 depicts a flow chart of an embodiment a method for managing battery life in the portable terminal 100 with regards to a super event and the absence of an operation event as the sleep event. For example, in block 410, the portable terminal is turned on. In response to being turned on, sleep mode is enabled in block 412. Once sleep mode is enabled, second processor 120 monitors for the detection of a super event, and determines whether the super event is detected in block 414. If no super event is detected ("No" at 414), then the second processor 120 continues to monitor for the detection of a super event. If a super event is detected ("Yes" at 414), then it is determined whether a non-continuous operation event is detected at block 416. If a non-continuous operation event is detected ("Yes" at 416), then a value non_cont_event is set to 1 at block 418. If a non-continuous operation event is not detected ("No" at 416), then the value non cont event is set to 0 at block 420. Then, after either block 418 or block 30, operation mode is enabled at block 422. In other words, the operation mode is enabled in response to the detection of the super event.

Once the operation mode is enabled, the portable terminal will monitor for the detection of a non-continuous operation event for a predetermined period of time, and determines whether a non-continuous operation event is detected at block 424. If the non-continuous event is detected within the predetermined period of time ("Yes" at 424), then the portable terminal 100 continues in operation mode and monitors for detection of a non-continuous operation event. If a non-continuous operation event is not detected ("No" at 424), then the portable terminal 100 determines whether a continuous operation event is detected at block 426. If a continuous operation event is detected ("Yes" at 426), then the portable terminal 100 continues in operation mode and monitors for detection of a non-continuous operation event at block 424. If a continuous operation event is not detected ("No" at 426), then the portable terminal enables sleep mode at block 412, and second processor 120 monitors for detection of a super event.

Figure 6:
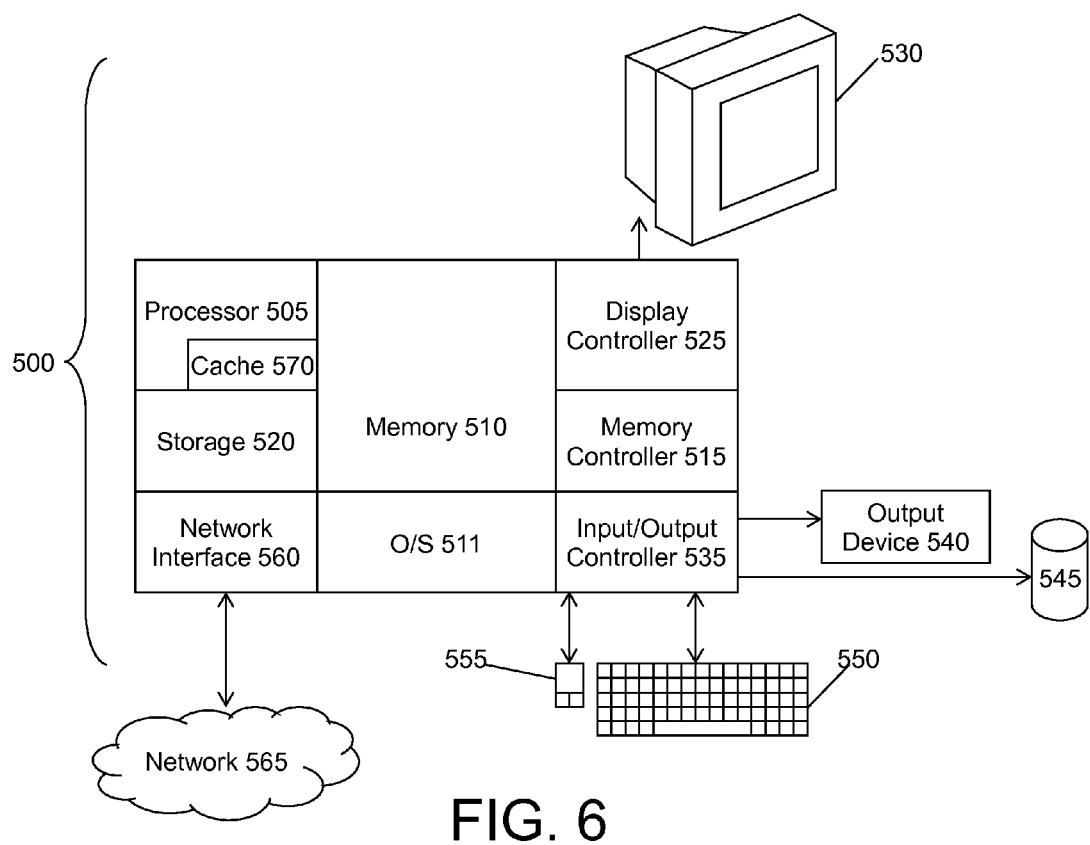
FIG. 6 depicts a block diagram of a computer system for implementing some or all aspects of the system, according to some embodiments of this disclosure.

FIG. 6 illustrates a block diagram of a computer system 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

Figure 7:
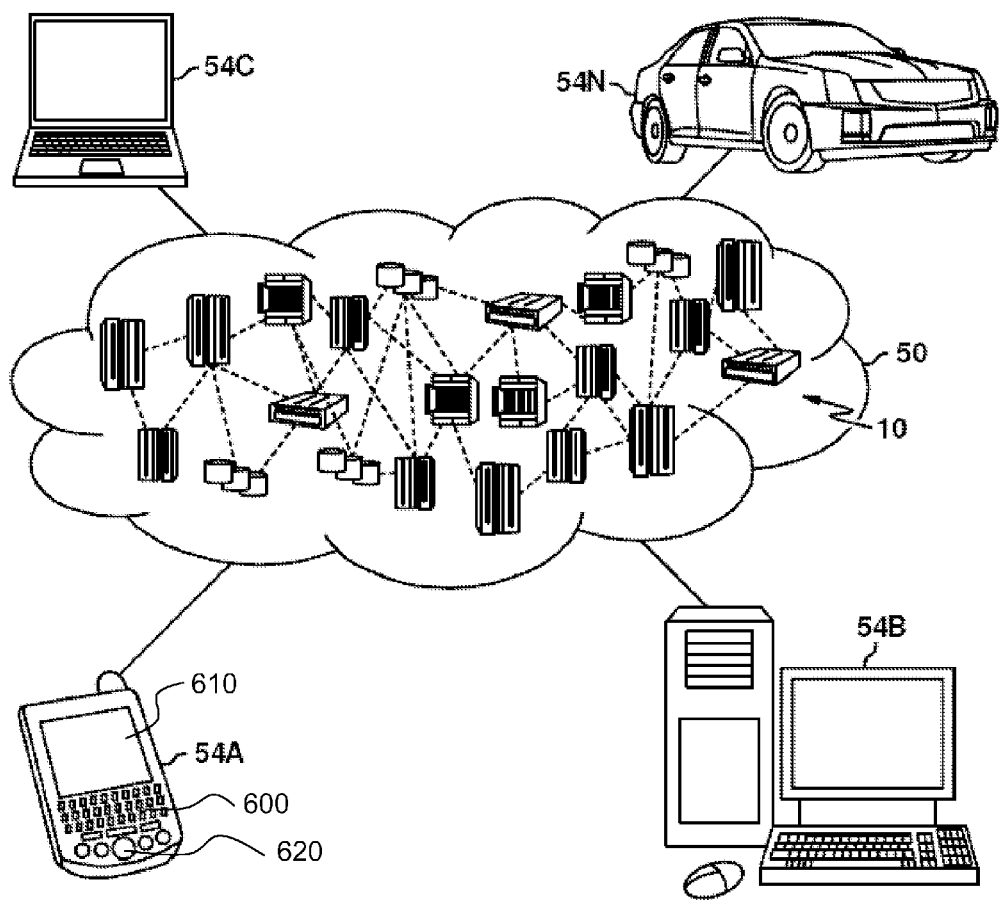
FIG. 7 depicts a cloud computing environment according to some embodiments of this disclosure.
Figure 8:
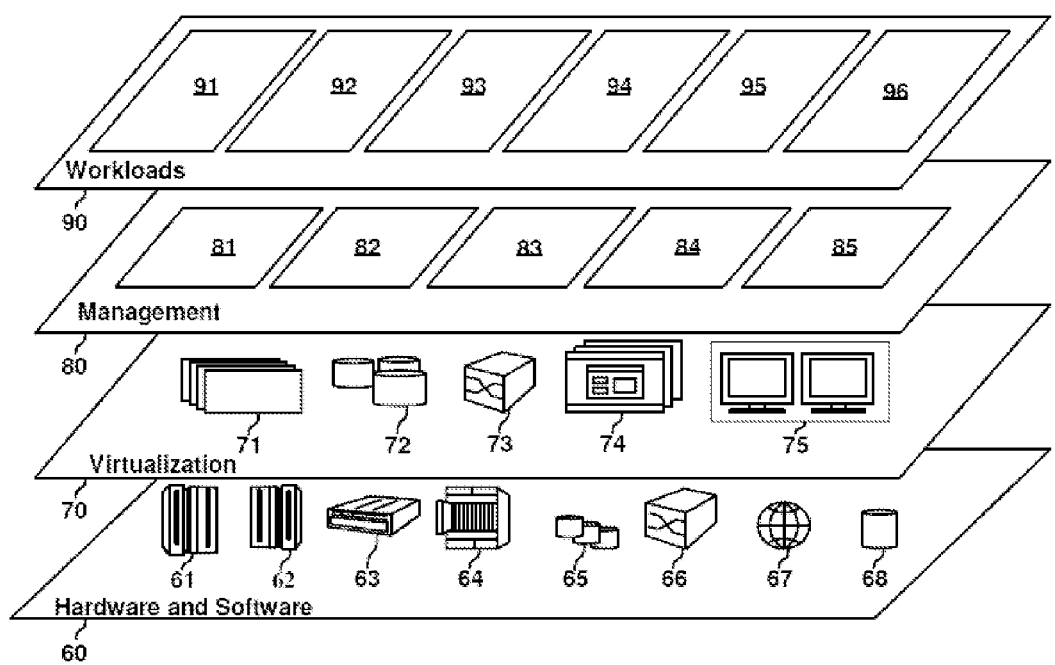
FIG. 8 depicts abstraction model layers according to some embodiments of this disclosure.

In some embodiments, as shown in FIG. 6, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. Additionally, in the context of a portable computer system such as portable terminal 100, input devices such as a keypad 600, touch screen 610, or other buttons 620 may be coupled to the I/O controller 535 (see FIG. 7). The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 6, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computer system 500 may further include a display controller 525 coupled to a display 530. Additionally, in the context of a portable computer system or portable terminal such as cellular telephone 54A, the display controller 525 may be couple to a touch screen 610 (see FIG. 7). In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 500, such as that illustrated in FIG. 6.

Technical effects and benefits of some embodiments include preserving the battery life of the portable terminal. By enabling operation modes and sleep modes, the battery power consumption of the portable terminal can be reduced in situations where the portable terminal is not being used or not likely to be used.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network and width, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring and analysis of incoming communications 96, so as to manage battery life in a portable terminal as described above.

What is claimed is:

1. A method for managing battery life in a portable terminal, the method comprising:
    enabling a sleep mode in the portable terminal in response to detection of a sleep event; and
    enabling an operation mode in the portable terminal in response to detection of an operation event, wherein the operation event can be either a continuous operation event and non-continuous operation events;
    wherein the portable terminal comprises a first processor and a second processor;
    wherein the enabling the sleep mode comprises reducing power consumption of the first processor;
    wherein the enabling the operation mode comprises detecting the operation event with the second processor while the portable terminal is in the sleep mode;
    wherein a rate of battery power consumption during the sleep mode is lower than a rate of battery power consumption during the operation mode.

2. The method of claim 1, wherein operation event comprises detection of the portable terminal within a predetermined location.

3. The method of claim 1, wherein the operation event comprises detection of proximity of the portable terminal to a predetermined object.

4. The method of claim 1, wherein the operation event comprises detection of connection of the portable terminal to an external power supply.

5. The method of claim 1, wherein the operation event comprises detection of a predetermined sound.

6. The method of claim 1, wherein the operation event comprises detection of a predetermined motion.

7. The method of claim 1, wherein the operation event comprises detection of an incoming communication.

8. The method of claim 1, wherein the operation event comprises receiving a signal from a cloud computing environment, wherein the cloud computing environment analyzes incoming communications to the portable terminal and determines whether the incoming communications satisfy a predetermined criterion for transitioning the portable terminal from the sleep mode to the operation mode.

9. The method of claim 1, wherein the operation event is a combination of two or more of: detection of the portable terminal within a predetermined location, detection of proximity of the portable terminal to a predetermined object, detection of connection of the portable terminal to an external power supply, detection of a predetermined sound, detection of a predetermined motion, or detection of an incoming communication.

10. The method of claim 1, wherein the operation event varies based on a battery power level of the portable terminal.

11. The method of claim 1, wherein the sleep event comprises detection of the absence of an operation event for a predetermined amount of time.

12. The method of claim 1, wherein the sleep event comprises detection of the battery power of the portable terminal being at or below a predetermined battery power threshold.

13. The method of claim 1, wherein the sleep event comprises detection of the portable terminal leaving a predetermined location.

14. The method of claim 1, wherein the sleep event comprises detection of the portable terminal leaving a proximity of a predetermined object.

15. The method of claim 1, wherein the sleep event comprises detection of the portable terminal being disconnected from an external power supply.

16. The method of claim 1, wherein the sleep event comprises detection of startup of the portable terminal.

17. The method of claim 1, wherein the enabling the sleep mode comprises turning off or closing active applications of the portable terminal.

18. A system comprising:
a first processor;
a second processor; and
a memory having computer readable instructions;
wherein the first processor and the second processor are structured to execute the computer readable instructions, the computer readable instructions comprising:
enabling a sleep mode in the portable terminal in response to detection of a sleep event; and
enabling an operation mode in the portable terminal in response to detection of an operation event, wherein the operation event can be either a continuous operation event and non-continuous operation events;
wherein the enabling the sleep mode comprises reducing power consumption of the first processor;
wherein the enabling the operation mode comprises detecting the operation event with the second processor while the portable terminal is in the sleep mode;
wherein a rate of battery power consumption during the sleep mode is lower than a rate of battery power consumption during the operation mode.

19. A computer program product for managing battery life in a portable terminal, the computer program product comprising a computer readable storage medium having program code embodied therewith, the program code executable by a processor for:
enabling a sleep mode in the portable terminal in response detection of a sleep event; and
enabling an operation mode in the portable terminal in response to detection of an operation event, wherein the operation event can be either a continuous operation event and non-continuous operation events;
wherein the portable terminal comprises a first processor and a second processor;
wherein the enabling the sleep mode comprises reducing power consumption of the first processor;
wherein the enabling the operation mode comprises detecting the operation event with the second processor while the portable terminal is in the sleep mode;
wherein a rate of battery power consumption during the sleep mode is lower than a rate of battery power consumption during the operation mode.

* * * * *